United States Patent [19]
Hummel

[11] 3,742,344
[45] June 26, 1973

[54] APPARATUS FOR MEASURING THE DIFFERENCES IN MAGNETIC SUSCEPTIBILITIES OF GASES

[76] Inventor: Heinz Hummel, Fasanenweg 14, Konigstein-Johanniswald, Germany

[22] Filed: Dec. 29, 1971

[21] Appl. No.: 213,576

[52] U.S. Cl. .................................. 324/36, 73/23 A
[51] Int. Cl. ........................................... G01r 33/12
[58] Field of Search ...................... 324/36; 73/23 R, 73/27 A

[56] References Cited
UNITED STATES PATENTS

| | | | |
|---|---|---|---|
| 2,416,344 | 2/1947 | Pauling | 73/27 A |
| 2,689,332 | 9/1954 | Greene | 73/27 A |
| 2,744,234 | 5/1956 | Munday et al. | 324/36 |
| 3,646,431 | 2/1972 | Janssen | 324/36 |

Primary Examiner—Robert J. Corcoran
Attorney—Ralf H. Siegemund

[57] ABSTRACT

Apparatus for measuring the difference in magnetic susceptibility of a sample gas and of a reference gas, the reference gas having particular, constant susceptibility; a magnetic circuit has at least one measuring gap with a plane or line of symmetry as to the magnetic field in the gap or of the gaps; a test body including two chambers of symmetrical configuration in relation to each other, one chamber provided for the reference gas, the other for the sample gas is resiliently suspended in the gap so that for zero reaction force the test body is symmetrically disposed in the gap or gaps with reference to the plane or line of symmetry (equilibrium position) when the contents of the chambers have equal magnetic susceptibility whereby the body extends in zones of magnetic inhomogeneity with similar volume as to portions of the body defining the two chambers.

11 Claims, 10 Drawing Figures

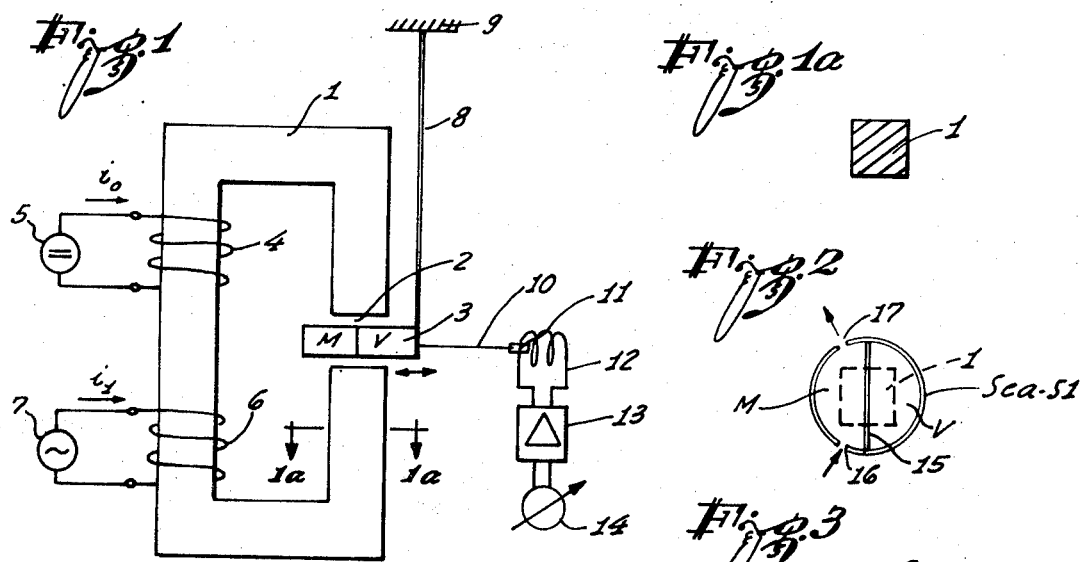
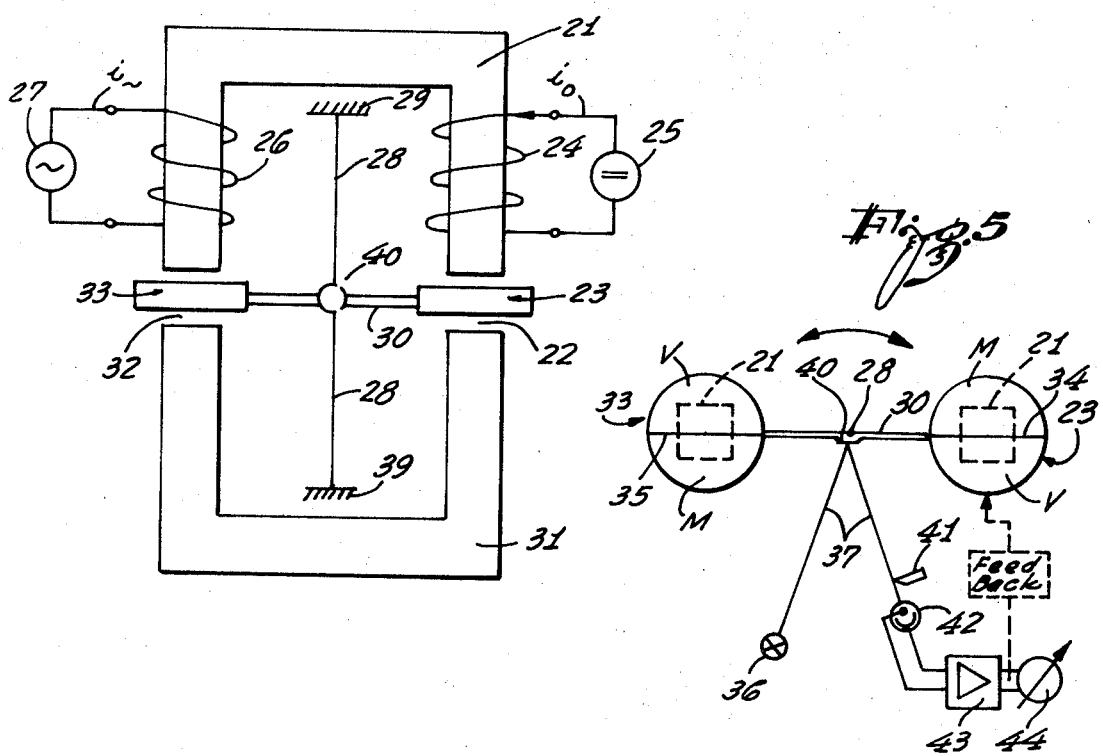

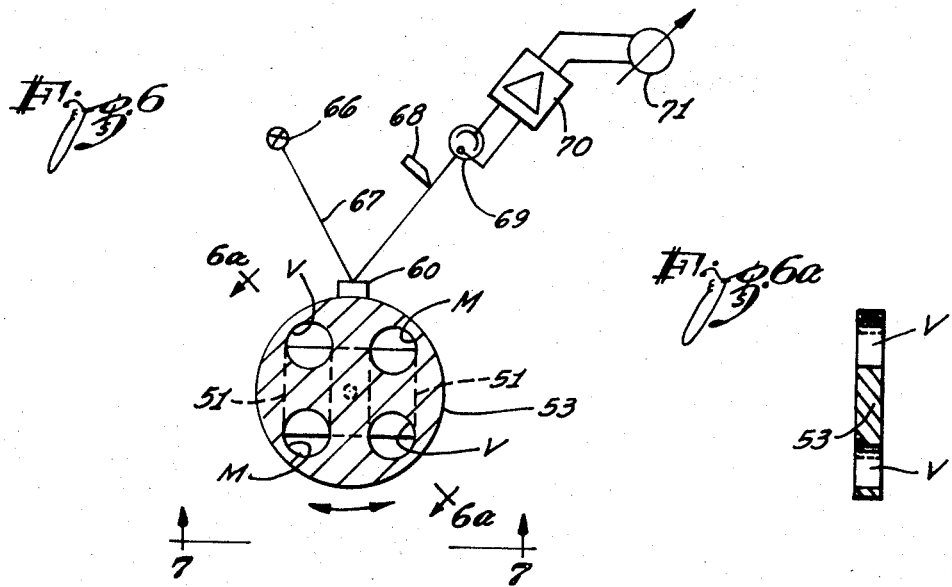
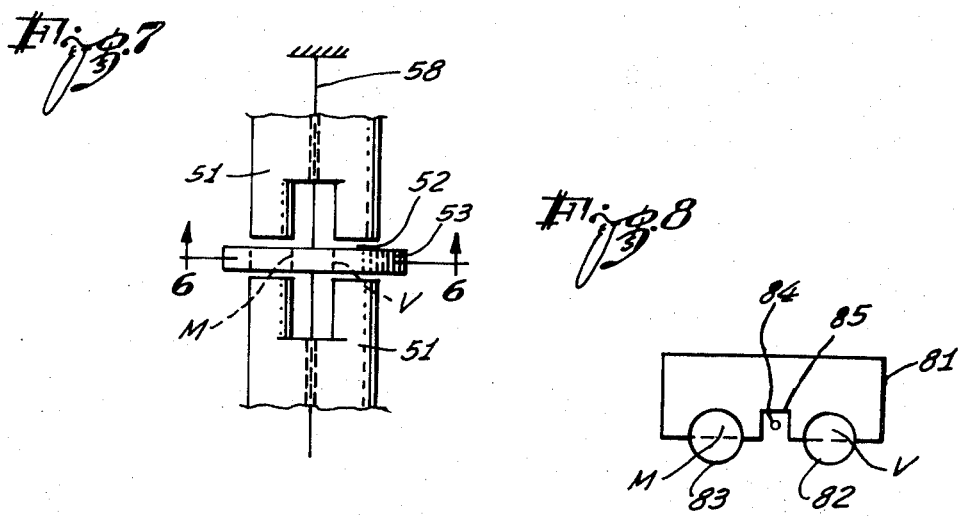

APPARATUS FOR MEASURING THE DIFFERENCES IN MAGNETIC SUSCEPTIBILITIES OF GASES

The present invention relates to the measurement of magnetic properties of gases, and here particularly for measuring differences in magnetic susceptibility of gas mixtures.

The state of the art is elaborated in a Handbook by Hengstenberg, "Messen und Regeln in der chemischen Technik" (measuring and controlling in chemical engineering), published 1964, pages 527 through 548. Measurement of the type to which the invention pertains generally is, for example, described also in U.S. Pat. No. 2,416,344. The known methods suffer from the particular disadvantage that the test body (usually a container for the gas) itself is subjected to and experiences forces which are not only not useful for the measurement, but which arise because the material of the test body has itself a particular magnetic permeability and susceptibility. That susceptibility may be low for a solid but, it still is significant when compared with a gas.

Assuming, for example, that the test body and gas sample container consists of two quartz balls or balloons of 2.5 mm diameter, and having a wall thickness of 0.1 mm. The volume susceptibility of quartz is about seven times as large as the volume susceptibility of oxygen. As a consequence, a torque is exerted upon the container which is 1.6 times the torque as it results from a change in magnetic susceptibility of a gas at the 100 percent oxygen content level. Usually, a measuring range is needed from zero to about 5 percent oxygen; for an accuracy of 0.1 percent absolute; the relative accuracy of determining oxygen content is then about 2 percent. Therefor, the disturbing torque set up in the test body as a whole is in reality 1,600 times as large as the torque change on the sample gas itself for that accuracy.

In addition, it is very disturbing that the temperature dependency of the susceptibility of the sample container (which is, of course, a solid body) is entirely different from the temperature dependency of, for example, a paramagnetic gas, such as oxygen. This means that any adjusted equilibrium for the sample container has validity only for one particular temperature; the equilibrium is disturbed even in case of minute temperature deviations.

It is an object of the present invention to avoid the deficiencies outlined above and to provide for a method of the type indicated which exhibits additional significant advantages. It is a particular object of the present invention to provide measurements of susceptibility differences of gas mixtures which is practicable and usable in the field and is not dependent on laboratory delicacies.

It is one of the basic aspects of the present invention that a stationary magnetic field without alternating component is impractical for carrying out the present invention. The preferred embodiment of the present invention is based on the assumption that the energizing magnetic field includes a stationary or invariable component with an alternating, i.e., time-variable field component superimposed. However, it should be mentioned that the principle of the present invention is applicable also when an invariable magnetic field is used alone.

The invention, therefore, relates particularly to a method that uses equipment for measuring the difference in susceptibility as it exists between two gases. The susceptibility of the sample gas is to be compared with the known susceptibility of a reference gas. The equipment includes magnet means which define a magnetic circuit with at least one measuring gap. A test body is constructed, for example, as a two chamber container, the material being of low magnetic permeability. This container is movably disposed in the gap by means of reaction force producing means (e.g., a spring, torsion bar or the like). The deflection of that container is indicative of difference in susceptibility of the gases in the two chambers. The method in accordance with the invention is particularly characterized in that this container includes two chambers of preferably similar shape and size; one of the chambers contains the reference gas; the other chambers holds or is flown through by the measuring or sample gas. This container is arranged in the gap so that for equilibrium position at equal magnetic susceptibility of the contents in the chambers, each of the chambers extends symmetrically into the inhomogenic zone of the magnetic field as traversing the gap so that test body portions equal in size but pertaining to the two chambers, traverse oppositely directed, local, inhomogenous fields being similar in local field strength and gradient.

The essence of the invention is, therefore, to be seen in the utilization of a container with two chambers as test body, one for the sample gas, the other one for the reference gas of constant or otherwise known consistency, which container is to be disposed in one of several gaps of a magnetic circuit, whereby care has been taken that for equal susceptibility of the two gases the resulting force acting on the container becomes zero. In case of a torsional oscillator, it is not the force or the sum of the forces, that has to be zero for these conditions, but the sum of the torques.

In accordance with the preferred embodiment of the present invention, the following result is obtained:

1. using a magnetic circuit with a homogenic field measuring gap and preferably small zones of inhomogenity, the container can be disposed in that field so that each of the gas chambers of that container extends symmetrically from the zone of a homogenic magnetic field into regions around the magnetic poles that are in fact field free.

2. Through appropriately shaping the several chambers and through appropriate positional association of the test body with the measuring gap, the two chambers extend into the magnetic zone of inhomogenic field so that in each partial or local region, similar field gradients are traversed always by similar volume elements of container material as well as gas. In addition, care can be taken that these conditions remain, even in case the container changes position in the gap, for example, due to oscillations.

Flat cylindrical or semi-cylindrical chambers are preferably used, but hollow spherical balloons can be used also as sample and reference gas containers. However, it was found that under otherwise similar conditions there is some loss in sensitivity when spherical containers are used, because only a comparatively small portion of the zone with inhomogenic magnetic field is utilized for measurement as compared in case of a cylindrically shaped chamber or chambers as gas container.

The method as set forth in the above-identified patent requires strict association between the balloons (or dumb bells) in relation to the magnetic field gradient because the measuring results obtained in this kind of equipment (where an inhomogenic field is used), is proportional to the product of the magnetic field strength and of the magnetic field gradient. For example, in the report by C.W Munday on the Conference of the Society of Instrument Technology in Swansea/England, September of 1957, it has been suggested to use a local field gradient of approximately 10,000 oersted per centimeter at 10,000 oersted field strength. As a consequence of such a high gradient, for a change in position of the test balloons by only 0.0007 mm in the equipment of that patent, the product of field and gradient changes already by 0.07 percent. A quartz balloon has a high diamagnetic characteristic, so that already a small position change corresponds approximately to an $O_2$ content measurement error by about 0.1 percent. The apparatus for practiciting the present invention has tolerance for position constancy in the equilibrium position that is two to three orders of magnitude higher.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates somewhat schematically an example of measuring equipment for practicing the method in accordance with the preferred embodiment of the present invention;

FIG. 1a is a section view 1a — 1a in FIG. 1;

FIG. 2 illustrates the sample container used in the equipment of FIG. 1 in top view;

FIG. 3 shows a modification for a sample container but also usable in the equipment shown in FIG. 1;

FIG. 4 illustrates another example for practicing the invention in accordance with the preferred embodiment thereof;

FIG. 5 illustrates a top view of the equipment shown in FIG. 4;

FIG. 6 shows another example for practicing the preferred embodiment of the present invention;

FIG. 6a is a section view along lines 6a—6a of FIG. 6;

FIG. 7 illustrates a side view of the equipment shown in FIG. 6;

FIG. 8 illustrates another container usable for practicing the method in accordance with the invention in any of the embodiments outlined above.

Proceeding now to the detailed description of the drawings, in FIG. 1 thereof is illustrated a ferromagnetic core or armature element 1 of rectangular cross section and establishing a loop. Two oppositely facing pole shoes define a measuring gap 2. A sample container 3 is disposed in gap 2. The ferromagnetic core 1 is energized by means of a coil 4 which is connected to a source of dc voltage, 5. A current io flows from source 5 through coil 4 and establishes a constant, i.e., a time invariable magnetic field across gap 2. In addition, there is provided a coil 6 on core 1. Coil 6 is connected to a source of ac voltage, 7, with a current $i_1$ flowing from the source 7 through the coil 6 at alternating polarity. Therefore, an alternating magnetic field is superimposed upon the time invariable magnetic field across gap 2, and the resulting magnetic field varies in time accordingly. The purpose of the time invariable field is to establish position bias, the time variable field acts as oscillation stimulating component.

As illustrated somewhat schematically, the sample container 3 includes a first gas chamber M for the gas or gas mixture whose susceptibility is to be measured; that gas is in the following called the sample or measuring gas. A second chamber V in container 3 is provided for the reference gas whose susceptibility is constant and known. The container 3 is secured to a stationary holder 9 by means of a bendable leaf spring 8 shown in edgewise projection in the drawing. Container 3 is capable of oscillating in direction of the double arrow.

A small permanent magnet 11 is connected to the chamber 3 by means of a connecting rod 10 or the like. The small magnet 11 dips into a coil 12 or any other suitable magnetic pickup device. The pickup arrangement for determining the position of chamber 3 may also include or be comprised of a soft iron element dipping into an energized coil and determining the inductance thereof by the extent of immersion. The variable position of magnet 11 in coil 12 is measured in appropriate manner as a result of inductive interaction.

Now, it is assumed that d-c current $i_o$ flows in coil 4, and an a-c current $i_1$ flows through coil 6. As a consequence, a time invariable magnetic field Ho is provided in gap 2 upon which is superimposed an alternating field H1. Next, it is assumed that chamber M contains pure oxygen ($O_2$), while nitrogen ($N_2$) is used as reference gas in chamber V. As a consequence, the container 3 is subjected as a whole to a periodically variable force K which is determined in accordance with the following equation:

$$K = 0.5 \ (H_o + H_1 \sin \omega \ t)^2 \cdot (\chi_{02} - \chi_{N2}) \cdot l_k \cdot b.$$

In this equation $\omega$ is the cyclic frequency of the a-c current; $\chi \ O_2$ and $\chi \ N_2$ are respectively the magnetic susceptibility of oxygen and nitrogen. $l_K$ is the length of gas container 3, and $b$ is the effective width thereof. In FIG. 2 that width $b$ is equal to the width of the measuring gap.

If we neglect the invariable field component (as it establishes position bias), and if we also neglect any component having twice the a-c frequency, the amplitude of the resulting force is then determined by the somewhat simplified equation:

$$K = H_o \cdot H_1 \cdot (\chi_{02} - \chi_{N2}) \cdot l_K \cdot b.$$

This oscillating force causes container 3 to oscillate as a result of the resilient and flexible suspension. The magnetic pickup arrangement 11 and 12 provides an a-c voltage representative of that oscillation. An amplifier 13 is connected to coil 12, and a recording or indicating instrument 14 is connected to output terminals of coil 12. Instrument 14 may be an indicator or a plotter; upon proper calibration instrument 14 will directly indicate the difference in magnetic susceptibility of the content of container chambers M and V.

FIG. 2 illustrates in somewhat greater detail the configuration of container 3. The container is provided as a flat, cylindrical element having a radially/axially extending wall 15. Wall 15 separates and defines chamber M and chamber V respectively for measuring and reference gases. Chamber M has two small openings 16 and 17 which permit flow-through of sample gas in chamber M so that actually the chamber M can be discharged at will.

Various other types of chambers to be explained below are usable as sample gas chambers. They may be provided with such openings in a similar manner, but these openings have been omitted. The reference gas chamber V, of course, does not require such openings, it can be charged with a predetermined and, therefor, known quantity of the reference gas. The reference gas can be maintained as reference or standard for that purpose as the chamber may be tightly sealed. Of course, the entire arrangement is disposed in a housing which is not shown, and it may be of advantage to have the entire interior of the housing penetrated and filled with measuring gas.

FIG. 2 illustrates also in dotted lines the square shaped front face of one magnetic pole. It can readily be seen that in the zero or equilibrium position the wall 15 runs through the center line of the magnetic field, that extends transverse to the plane of the drawing in FIG. 2. The container extends symmetrically with its chambers into the zones of magnetic inhomogeneities, particularly the wall portions do so extend.

Proceeding now to the description of FIG. 3, there is illustrated a somewhat modified construction for the sample container 3a. There is provided a plate of plastic, quartz or of any other electrically and magnetically insulating material having thickness, for example, of about 2 mm. This plate is provided with two bores; these bores establish the chambers M and V. These bores are cylindrical and enclosed on both sides by windows each having a thickness of about 0.2 mm. As a consequence, two flat cylindrical chambers V and M are established. As indicated somewhat schematically, this chamber has position in relation to the magnetic field, as indicated in dotted lines for the front face of one of the poles of core 1. Again, the symmetry of positioning the two chambers can readily be seen from this illustration.

FIG. 1 illustrated an oscillating arrangement in which a reed type or a leaf spring type vibrator oscillates when chamber 3 is magnetically energized by the periodically time variable magnetic field. In FIG. 4 now there is illustrated an arrangement in which the magnetic force will cause torsional oscillation.

FIG. 4 illustrates two magnetic cores 21 and 31. They are U-shaped and face each other so that two measuring gaps 22 and 32 are respectively established with facing arms and poles. There are provided two sample chambers 23 and 33 which are interconnected by a rod or any other rigid connection 30. Elements 23, 33 and 30 are suspended by means of a torsion bar or fiber 28 connected at both ends in stationary holders 29 and 39. A mirror 40 is centrally disposed, and the plane of the reflecting surface of that mirror is a position indicator for the two chambers 23 and 33.

Again, there is provided a coil 24 on core 21, and the coil 24 is connected to a source 25 of d-c voltage potential. Source 25 provides d-c energization of coil 24, and a time invariable magnetic field component is accordingly set up across the two gaps 22 and 32. A coil 26 is disposed on core 21, symmetrically to coil 24; such symmetry, however, is not necessary in principle. Coil 26 is connected to a source 27 of a-c voltage potential. As a consequence, a periodically variable magnetic field is set up in the magnetic circuit as described.

Each of the containers 23 and 33 is biparted, there being separating walls 34 and 35, respectively, to establish a measuring chamber M and a reference chamber V in each of these containers. FIG. 5 illustrates this particular chamber arrangement in equilibrium position. The relative position of the poles are also shown in face end view. These poles set up the magnetic field for traversing the containers with center lines of the field in each gap respectively traversing separating walls 34 and 35 in the equilibrium position of zero torque. Therefore, it can readily be seen that equal and similarly shaped chamber portions are traversed by similar local magnetic field lines as far as density, direction and gradient is concerned. Essentially, each of these two containers 23 and 33 corresponds to the container shown in FIG. 2.

The measuring equipment itself is shown in greater detail in FIG. 5, illustrating a source 36 of light; a light beam 37 is directed from source 36 towards mirror 40 on torsion element 28. Suitable optical means, such as lenses or lens systems, are interposed in the optical path along beam 37, as is known per se for instruments using variable beam deflection.

By means of an edge-like (single side) light stop or aperture 41, the position of the reflected beam is detected, using here particularly a photocell or any other suitable photoelectric detector 42. The output of detector 42 is connected to an a-c amplifier 43 who drives an indicator or any other recording instrument. The voltage of the output signal provided by amplfier 43 is, in fact, indicative of the position of mirror 40 and that, in turn, is indicative of the relative position of the two containers 23 and 33 within the magnetic measuring or test gaps 22 and 32, respectively.

The measuring result obtained with the instrument of FIGS. 4 and 5 is substantially independent, for not too large changes, from the static equilibrium position of the oscillator, because of asymmetric disposition of sample gas and reference gas chambers, in each container with reference to the plane as defined by the two dividers 34–35. The output voltage (or current) of amplifier 43 is, in fact, proportional to the amplitude of the torsional oscillator and that amplitude, in turn, is directly proportional to the difference in magnetic susceptibility of the contents of chambers M and V.

The illustrated arrangement can be modified in such a manner that, for example, both containers are looped by a coil having a single winding, the winding plane being parallel to the gap. An electrical signal, such as a signal representative of output current voltage or is derived from amplifier 43 and fed through these coils. This way, a feedback system of high gain is established. It should be mentioned that a single coil on one of these two containers may suffice for that purpose. The direction of winding and the polarity of the resulting electric field must be chosen properly so that the oscillator itself is compensated or attenuated up to the point that the amplitude of the oscillation is reduced to zero. In case of complete compensation, the oscillator is, in fact, retained in rest. The resulting compensation current needed for oscillation suppression is a proportional indicator for the difference in susceptibility in the contents of chambers M and V. Again, it should be mentioned that any change in the static position of the oscillator has little influence on the measuring results; this is so because of the particular arrangement of the two chambers V and M in each of the containers 23 and 33 as illustrated in FIG. 4.

For reasons of completion, it should be mentioned that actually the compensation in that manner does not require use of an electrical feedback system, but other electrical, magnetical or even mechanical devices can be used to establish a corresponding feedback compensating system.

Proceeding now to the detailed description of FIGS. 6, 6a and 7, there is shown another example for practicing the preferred embodiment of the present invention. Actually, the device shown has four gas chambers and a double or dual gap. The function of that equipment is actually derivable directly upon review of FIGS. 1 through 5. For this reason, the magnetic circuit, poles, etc., as well as energizing coils have been omitted in FIG. 6. Only the pole shoes 51 are indicated somewhat schematically. Measuring gap 52 is established by these poles, and there are two rectangularly shaped pole shoe faces visible in FIG. 6.

The four chambers for gas are arranged so that in the projection of FIG. 6, edges of the pole shoes run through the middle of the chambers. Two of these chambers are designated M, and they will contain measuring gas, the other two chambers are designated V, and they contain reference gas. The body 53 is a torsional oscillator with suspension fiber 58 the double arrow in FIG. 6 indicating oscillatory deflection.

Elements 66, 67, 60 and 69 establish the optical part for scanning the position of the oscillator. Light source 66 furnishes a beam of light 67 that impinges upon a mirror 60. The mirror 60 is disposed on the torsion fiber 58 for oscillation as outlined above. The diaphragm or light stop member 68 is provided to determine the amount of light that may fall onto the photo detector 69. The arrangement is completed by an amplifier 70, preferably an a-c amplifier connected to photocell 69. Amplifier 70 drives an instrument 71 or a recorder. It can readily be seen that the magnetic deflection force as provided in this arrangement is considerably larger. It can also be seen that the inventive method can be practiced with advantage if several small gas balloons containing measuring chambers are used rather than one big one. It is more easily possible in this manner to provide for the various conditions for positioning the measuring chambers on one hand and field inhomogeneity on the other hand.

Referring now to FIG. 8, it illustrates a somewhat simplified version of the present invention. Here there is a torsional oscillator 82, 83 and 84 provided for including in particular a torsional suspension 84 with mirror, a first chamber 82 and a second chamber 83, 81 is the pole face of a magnet having a recess 85 for suspension 84. In this case, chamber 82 corresponds to chamber V; 83 corresponds to chamber M in the previous example. Therefore, there is a somewhat simplified organization and separation for the several chambers. But in neither case is magnetic susceptibility measured in relation to an undefined environment.

The magnetic core is provided with a gap 85 which includes or is provided for receiving the torsion fiber 84. The oscillator is scanned as is shown in FIG. 5.

Another advantage of the arrangement in accordance with examples where using torsion oscillators and optical scanning is seen in the fact that only one photocell is used, there is no need for photoelectric compensation or the like. The frequency range for the alternating field can be derived from the general state of the art as it refers to electric, mechanical and optic-mechanical oscillators and oscillating devices. It is emphasized that the phenomena to be exploited does not limit the frequency range for low and medium frequency values. It was found that frequencies to be employed are preferably taken from between 2 and 200 Hertz, as far as the setting up of the magnetic field is concerned. Also, it should be mentioned that a double coil system for magnetization is not necessary. One could use a single coil to energize the system with a pulsating or amplitude variable d-c. Finally, one could use a permanent magnetic to establish the constant magnetic field, and an a-c field is superimposed by using a coil on the magnet and energizing the coil with a-c.

In order to increase the signal-to-noise ratio, particularly for measuring the amplitude of the oscillator, without, however, having to increase the gain of the amplifier, it was found of advantage and has actually been used to select the resonance frequency of the oscillator to be equal to the frequency of the a-c field. In this case, there is a sufficiently small attenuation of the oscillator, and the operation at resonance, in fact, provides a strong gain increase of the equipment.

The invention has been described with reference to equipment preferably to be used for measuring susceptibility of oxygen concentration. It was found that the method in accordance with the invention offers the following additional advantage for this type use. In fact, it was found that the measuring result was substantially independent from the flow-through condition of the sample chamber. Except, of course, for any diamagnetic flow, the measuring result was substantially independent of the consistency of the gas that contained the oxygen. Apparently, the response of the measuring equipment, particularly the response to change in gas consistency is amazingly high.

The invention is not limited to the embodiments described above but all changes and modifications thereof not constituting departures from the spirit and scope of the invention are intended to be included.

I claim:

1. Apparatus for measuring the difference in magnetic susceptibility of a sample gas and of a reference gas, the reference gas having particular, constant susceptibility, comprising:

magnet means defining a magnetic circuit and having pole shoe means establishing at least one measuring gap traversed by a magnetic field produced by the magnet means, there being a plane or line of symmetry bisecting said pole shoe means and said gap between said pole shoe means so that the magnetic field in the gap is symetrical with respect to said plane or line of symetry and having zones of homogeneity and inhomogeneity on both sides of said plane or line of symmetry;

a test body including two chambers of symmetrical configuration in relation to each other, one chamber provided for the reference gas, the other for the sample gas;

resilient and flexible suspension means for suspending and positioning the test body in the gap in the absence of a force acting on the test body due to the interaction of the test body with the magnetic field so that for zero force the test body is maintained in symmetrical disposition with reference to the plane or line of symmetry (equilibrium position, one chamber to one side, the other chamber to the other side of said plane or line) when the contents of the chambers have equal magnetic susceptibility, the body extending in said zones of magnetic inhomogeneity, at least when in equilibrium position and with similar volume as to portions of the body defining the two chambers, as well as gas filling the chambers, the resilient and flexible suspension means tending to restore the equilibrium position when the test body is deflected therefrom, a difference in magnetic susceptibility of the gases in the chambers establishing a force tending to deflect the body from the equilibrium position; and means for providing indicating representation of the force tending to deflect the body from said equilibrium position in dependence upon the difference in magnetic susceptibility as between the reference gas in said one chamber and the sample gas in the other chamber.

2. Apparatus as in claim 1, the test body including a pair of chambers having a divider wall that includes a plane of symmetry for the two chambers of the pair, the plane or line of symetry of the magnet means traversing the plane for said chambers for said equilibrium position.

3. Apparatus as in claim 1, the magnet means defining a pair of gaps, the test body having two pairs of chambers, one pair each arranged in a gap of the pair, one chamber of each pair provided for the reference gas, the other one for the sample gas.

4. Apparatus as in claim 1, the magnet means providing a time variable magnetic field for causing the body to oscillate.

5. Apparatus as in claim 4, the magnetic field varying at resonance frequency of the body as positioned by the resilient and flexible suspension means.

6. Apparatus as in claim 4, and including means responsive to the oscillations of the body for providing negative feedback for suppressing oscillation of the body, the means for providing indicating representation including means for measuring the amount of feedback.

7. Apparatus as in claim 1, wherein the means for providing indicating representation includes compensating means for maintaining the body in said equilibrium position for gases of different magnetic susceptibility in said two chambers.

8. Apparatus as in claim 1, the body having cylindrical configuration, the chambers separated by a wall running through the cylinder axis, the axis coinciding with the line of symmetry of the field in the gap.

9. Apparatus as in claim 1, the pole shoe means of the magnet means having parallel surfaces for establishing the gap, the test body being positioned between the pole shoes, the volume of gas and portions of the body in the zones of inhomogeneities remaining constant upon displacement of said body.

10. Apparatus as in claim 9, the magnet means including means to periodically vary the magnetic field for causing the body undergo oscillations.

11. Apparatus as in claim 10, and wherein the means for providing indicating representation includes compensating means for suppressing oscillations of the body, and means for measuring the amount of compensation needed.

* * * * *